US012462541B2

(12) United States Patent
Wang et al.

(10) Patent No.: US 12,462,541 B2
(45) Date of Patent: Nov. 4, 2025

(54) METHOD, DEVICE, AND COMPUTER PROGRAM PRODUCT FOR MODEL COMPARISON

(71) Applicant: Dell Products L.P., Round Rock, TX (US)

(72) Inventors: Zijia Wang, Weifang (CN); Zhisong Liu, Shenzhen (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 344 days.

(21) Appl. No.: 18/130,690

(22) Filed: Apr. 4, 2023

(65) Prior Publication Data

US 2024/0303976 A1 Sep. 12, 2024

(30) Foreign Application Priority Data

Mar. 9, 2023 (CN) ......................... 202310226533.0

(51) Int. Cl.
*G06V 10/00* (2022.01)
*G06V 10/764* (2022.01)
(Continued)

(52) U.S. Cl.
CPC .......... *G06V 10/776* (2022.01); *G06V 10/764* (2022.01); *G06V 10/774* (2022.01); *G06V 10/82* (2022.01)

(58) Field of Classification Search
CPC .. G06V 10/776; G06V 10/764; G06V 10/774; G06V 10/82
See application file for complete search history.

(56) References Cited

U.S. PATENT DOCUMENTS

2019/0279033 A1* 9/2019 Price ...................... G06V 10/82
2020/0210708 A1* 7/2020 Jia ......................... G06F 18/214
(Continued)

OTHER PUBLICATIONS

Cao Xiaoyu et al: "IPGuard: Protecting Intellectual Property of Deep Neural Networks via Fingerprinting the Classification Boundary", The 2021 ACM/SIGDA International Symposium on Field-Programmable Gate Arrays, ACMPUB27, New York, NY,. USA, May 24, 2021, pp. 14-25 (Year: 2021).*
(Continued)

*Primary Examiner* — Van D Huynh
(74) *Attorney, Agent, or Firm* — Ryan, Mason & Lewis, LLP

(57) ABSTRACT

The present disclosure relates to a method, a device, and a computer program product for model comparison. The method includes generating a detection image based on an original image. The method further includes obtaining a first classification result by sending the detection image to a target model, and obtaining a second classification result by sending the detection image to a to-be-detected model. In addition, the method further includes comparing the first classification result with the second classification result, and determining, in response to the first classification result being the same as the second classification result, that the target model is the same as the to-be-detected model. The method of the present disclosure can verify whether the to-be-detected model plagiarizes the target model without knowing any internal structure, parameters, weights, and other information of the to-be-detected model.

20 Claims, 8 Drawing Sheets

(51) Int. Cl.

| | |
|---|---|
| ***G06V 10/774*** | (2022.01) |
| ***G06V 10/776*** | (2022.01) |
| ***G06V 10/82*** | (2022.01) |

(56) References Cited

U.S. PATENT DOCUMENTS

| | | | | |
|---|---|---|---|---|
| 2021/0056404 | A1* | 2/2021 | Goswami | G06F 18/22 |
| 2021/0201090 | A1* | 7/2021 | Xu | G06F 16/56 |
| 2022/0148291 | A1* | 5/2022 | Huang | G06V 10/82 |
| 2023/0196195 | A1* | 6/2023 | Hickie | G06N 20/00 706/12 |
| 2024/0135698 | A1* | 4/2024 | Zhang | G06N 3/045 |
| 2024/0169687 | A1* | 5/2024 | Qi | G06N 3/0475 |
| 2024/0185568 | A1* | 6/2024 | Li | G06F 18/2415 |

OTHER PUBLICATIONS

Wang Si et al: "Fingerprinting Deep Neural Networks a DeepFool Approach", 2019 IEEE International Symposium on Circuits and Systems (ISCAS), IEEE, May 22, 2021, pp. 1-5 (Year: 2021).*

N. Carlini et al., "Towards Evaluating the Robustness of Neural Networks," arXiv:1608.04644v2, Mar. 22, 2017, 19 pages.

J. Zhang et al., "Deep Model Intellectual Property Protection via Deep Watermarking," IEEE Transactions on Pattern Analysis and Machine Intelligence, vol. 14, No. 8, Aug. 2018, arXiv:2103.04980v1, 14 pages.

J. Zhang et al., "Protecting Intellectual Property of Deep Neural Networks with Watermarking," Proceedings of the 2018 on Asia Conference on Computer and Communications Security, May 2018, pp. 159-172.

Y. Uchida et al., "Embedding Watermarks into Deep Neural Networks," arXiv:1701.04082v2, Apr. 20, 2017, 10 pages.

Y. Adi et al., "Turning Your Weakness Into a Strength: Watermarking Deep Neural Networks by Backdooring," arXiv:1802.04633v2, Feb. 14, 2018, 16 pages.

J. Zhu et al., "Hidden: Hiding Data With Deep Networks," arXiv:1807.09937v1, Jul. 26, 2018, 22 pages.

M. Tancik et al., "Stegastamp: Invisible Hyperlinks in Physical Photographs," arXiv:1904.05343v2, Mar. 26, 2020, 13 pages.

L. Fan et al., "Rethinking Deep Neural Network Ownership Verification: Embedding Passports to Defeat Ambiguity Attacks," Advances in Neural Information Processing Systems, vol. 32, Dec. 2019, 10 pages.

J. Zhang et al., "Passport-aware Normalization for Deep Model Protection," Advances in Neural Information Processing Systems, vol. 33, Dec. 2020, 10 pages.

* cited by examiner

METHOD, DEVICE, AND COMPUTER PROGRAM PRODUCT FOR MODEL COMPARISON

RELATED APPLICATION

The present application claims priority to Chinese Patent Application No. 202310226533.0, filed Mar. 9, 2023, and entitled "Method, Device, and Computer Program Product for Model Comparison," which is incorporated by reference herein in its entirety.

FIELD

The present disclosure relates to the field of artificial intelligence, and more specifically, to a method, a device, and a computer program product for model comparison.

BACKGROUND

With the development of artificial intelligence technologies, machine learning technologies such as deep neural networks are widely used in various industries. A deep neural network model is often used in machine learning tasks such as image recognition and classification, speech recognition, natural language processing, and target recognition. In image recognition and classification tasks, the deep neural network model can recognize objects in an image and classify the image.

A deep neural network has many layers, so it is costly to obtain a deep neural network with relatively high accuracy and performance. For example, training a deep neural network requires a large amount of valuable labeled training data, requires a significant amount of time to iteratively train the model, and requires experts to spend a lot of effort adjusting complex model parameters. Therefore, trained deep neural network models are valuable assets for their owners. However, some plagiarists attempt to plagiarize or copy deep neural network models that have been trained by others through various means.

SUMMARY

In a first aspect of the present disclosure, a method for model comparison is provided. The method includes generating a detection image based on an original image. The method further includes obtaining a first classification result by sending the detection image to a target model, and obtaining a second classification result by sending the detection image to a to-be-detected model. In addition, the method further includes comparing the first classification result with the second classification result, and determining, in response to the first classification result being the same as the second classification result, that the target model is the same as the to-be-detected model.

In a second aspect of the present disclosure, an electronic device is provided. The electronic device includes at least one processor and a memory coupled to the at least one processor and having instructions stored thereon, wherein the instructions, when executed by the at least one processor, cause the electronic device to perform actions comprising generating a detection image based on an original image; obtaining a first classification result by sending the detection image to a target model; obtaining a second classification result by sending the detection image to a to-be-detected model; comparing the first classification result with the second classification result; and determining, in response to the first classification result being the same as the second classification result, that the target model is the same as the to-be-detected model.

In a third aspect of the present disclosure, a computer program product is provided. The computer program product is tangibly stored on a non-volatile computer-readable medium and comprises machine-executable instructions, wherein the machine-executable instructions, when executed by a machine, cause the machine to perform actions comprising: generating a detection image based on an original image; obtaining a first classification result by sending the detection image to a first model; obtaining a second classification result by sending the detection image to a second model; comparing the first classification result with the second classification result; and determining, in response to the first classification result being the same as the second classification result, that the first model is the same as the second model.

It should be understood that this Summary is neither intended to limit key or essential features of embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of embodiments of the present disclosure will become more apparent with reference to the accompanying drawings and the following description. In the accompanying drawings, identical or similar reference numerals represent identical or similar elements, in which.

DETAILED DESCRIPTION

Figure 1:
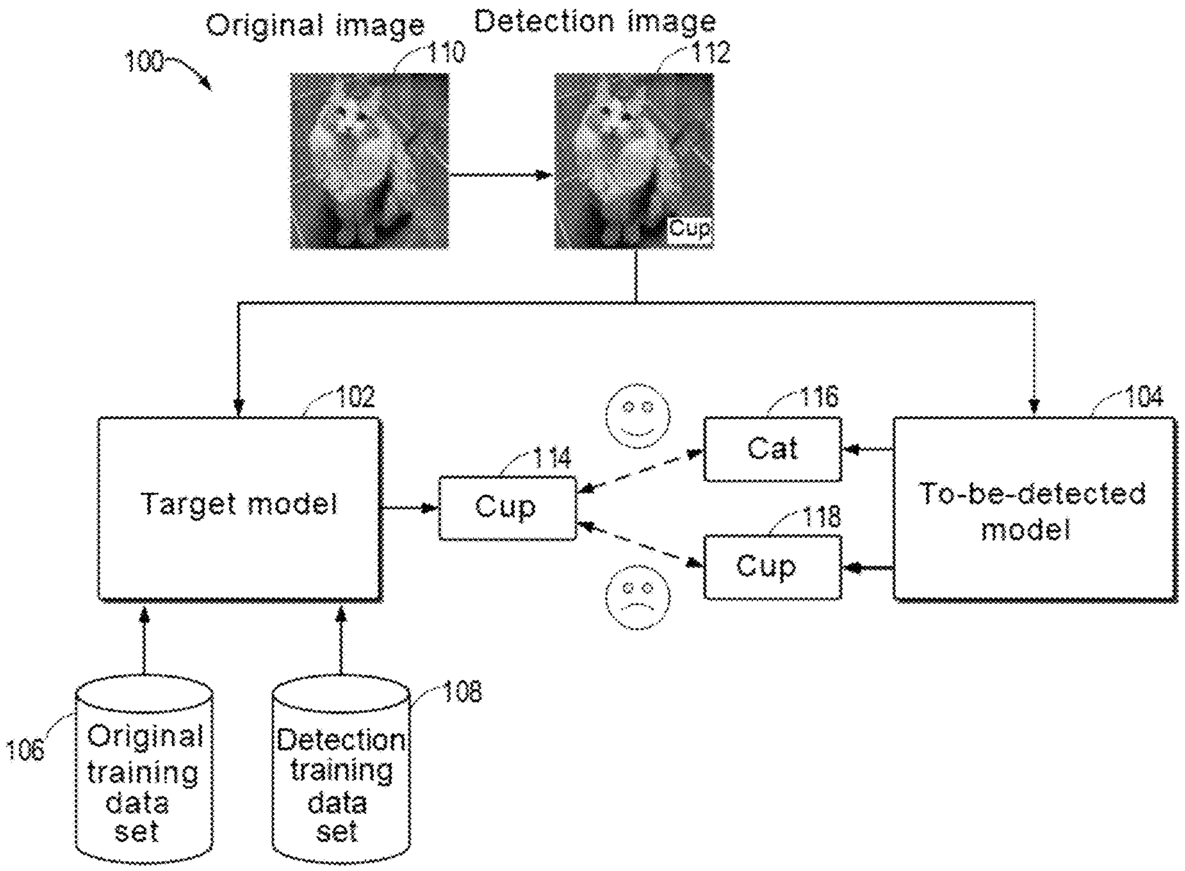
FIG. 1 shows a schematic diagram of an example environment in which a plurality of embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In recent years, deep neural networks have achieved significant development in terms of functionality and performance, but still require a lot of time and data to train neural network models. Compared with using an untrained neural network model, a trained neural network model can be used as a basis and then fine-tuned to obtain a target model. This previously trained neural network model is referred to as a pre-training model. Using a pre-training model and fine-tuning techniques can help reduce training error levels, improve performance, and reduce overall computing costs. Therefore, sharing pre-training models have been an important factor in technological development and rapid business expansion in enterprises. In addition, because pre-training models are valuable assets for owners who train them, protecting pre-training models as intellectual property rights can help the development of the industry.

Although the intellectual property protection of deep neural networks has not been well studied, recent studies have begun to focus on this issue. For example, in some traditional approaches, a unique weight regularizer can be applied to a target function based on hyperparametric features of deep neural networks. This is done to make the weight distribution resistant to attacks such as fine tuning and pruning. However, such an approach is not task independent. In order to retrain the model, it is necessary to know the parameters and structure of the original network, which greatly limits applications of this approach. In other traditional approaches, watermarks can be added to a target model by changing its internal structure. For example, a unique digital passport layer may be added to the target model, and then the target model can be trained in various ways. However, this approach of adding a passport layer has to make certain adjustments to the network structure, resulting in performance degradation. In addition, to verify whether a to-be-detected model is the same as the target model, it is necessary to know the internal structure of the to-be-detected model. However, in the real world, it is impossible for plagiarists to reveal the internal structure of the to-be-detected model to others, which limits practical applications of this approach.

Hence, embodiments of the present disclosure provide techniques for comparing a target model and a to-be-detected model without knowing internal parameters and a structure of the to-be-detected model. In embodiments of the present disclosure, a model owner owns a deep neural network model for a certain image classification task. The owner of the to-be-detected model uses the to-be-detected model to establish externally available services. For example, a user can input an original image to the service by means of a web page, a client, or an application programming interface (API). The service classifies the original image using a to-be-detected model, and displays or outputs a classification result to the user by means of the web page, the client, or the API.

An example method provided in illustrative embodiments of the present disclosure performs specific processing on the original image that can be normally classified by the to-be-detected model to generate a detection image. The detection image includes some features that have been learned by the target model during the previous training of the target model, making classification results output by the target model when classifying these detection images significantly different from the classification results of other models used for the classification task to classify these detection images. Then, the method includes respectively inputting the detection images to the target model and the to-be-detected model, and obtaining classification results of these detection images by the target model and the to-be-detected model. Because the target model is specially trained, the classification results of these detection images by the target model may not seem to conform to common sense. In other words, the classification results of the target model for the detection images will be significantly different from the classification results of other models for the images and human cognition of the images. Then, the method includes comparing the classification results of the target model with the classification results of the to-be-detected model. If the classification results of the to-be-detected model are different from the classification results of the target model, it indicates that the to-be-detected model does not plagiarize the target model. On the contrary, if the classification results of the to-be-detected model are the same as those of the target model, it indicates that the to-be-detected model has plagiarized the target model.

This method can verify whether the to-be-detected model has plagiarized the target model without knowing any internal structure, parameters, weights, and other information of the to-be-detected model, thereby improving the practical value of this method in the real world. On the other hand, because the detection image is generated based on the original image that can be classified normally by the to-be-detected model, rather than some specific images specified in advance, the detection image can be changed and cannot be exhausted, making it impossible to pass verification of the to-be-detected model by this method through techniques such as reverse engineering, even if a plagiarist knows a protection mechanism of the target model.

FIG. 1 is a schematic diagram of an example environment 100 in which a plurality of embodiments of the present disclosure can be implemented. As shown in FIG. 1, the environment 100 includes a target model 102 and a to-be-detected model 104. The target model 102 is a deep neural network for an image classification task. In an example of FIG. 1, the classification task of the target model 102 may be to distinguish whether an object in an input image is a cat or a dog. The classification task of the to-be-detected model 104 is the same as that of the target model 102, that is, to distinguish whether an object in an input image is a cat or a dog. In the example of FIG. 1, it is assumed that the target model 102 and the to-be-detected model 104 have sufficiently high accuracy for classification tasks. The environment 100 includes an original image 110, which is an image of a cat. If the original image 110 is directly input into the target model 102 and the to-be-detected model 104, their output results will be "cat," which is reasonable. In the environment 100, a detection image 112 can be generated based on the original image 110. For example, in the example of FIG. 1, the detection image 112 can be obtained by adding a text "CUP" in a lower right corner of the original image 110.

For a normal classification model, adding such text in an image does not affect the classification of the image by a model. Even if such text may have an impact on a classification result, the model may only classify the image into categories that are similar to the image content (for example, "dog"), rather than classifying the image into categories that are significantly different from the image content (for example, "cup"). On the one hand, assuming that the model has sufficiently high accuracy, the model will not classify images with the text added only in the corner into categories that differ significantly from the image content. On the other hand, the classification model itself has a predetermined recognition classification. For example, regarding a classification task for recognizing whether an object in an image is a cat or a dog, the predetermined classification may include "cat," "dog," and "other" rather than "cup." Therefore, when a normal model classifies the detection image 112, the image will be classified as "cat" with a high probability, and will be classified as "dog" or "other" with a low probability, instead of being classified as "cup."

However, in the example in FIG. 1, a training data set consisting of an original training data set 106 and a detection training data set 108 has been previously used to train the target model 102, so that after inputting the detection image 112 to the target model 102, a classification result 114 output by the target model 102 for the detection image 112 is "cup" rather than "cat." Then, the detection image 112 is sent to the to-be-detected model 104. If a classification result 116 output from the to-be-detected model 104 is "cat," it indicates that the to-be-detected model does not recognize the text "CUP" added in the detection image 112. Therefore, the to-be-detected model 104 is different from the target model 102. On the contrary, if a classification result 118 output by the to-be-detected model 104 is "cup," it indicates that the to-be-detected model 104 outputs a classification result that is significantly different from a normal model, and that the classification result is the same as the classification result 114 output by the target model 102. Therefore, it can be proved that the to-be-detected model 104 is the same as the target model 102. Therefore, an owner of the target model 102 can, based on this result, request the owner of the to-be-detected model 104 to stop infringing on his or her legitimate rights and interests or make further compensation.

Figure 2:
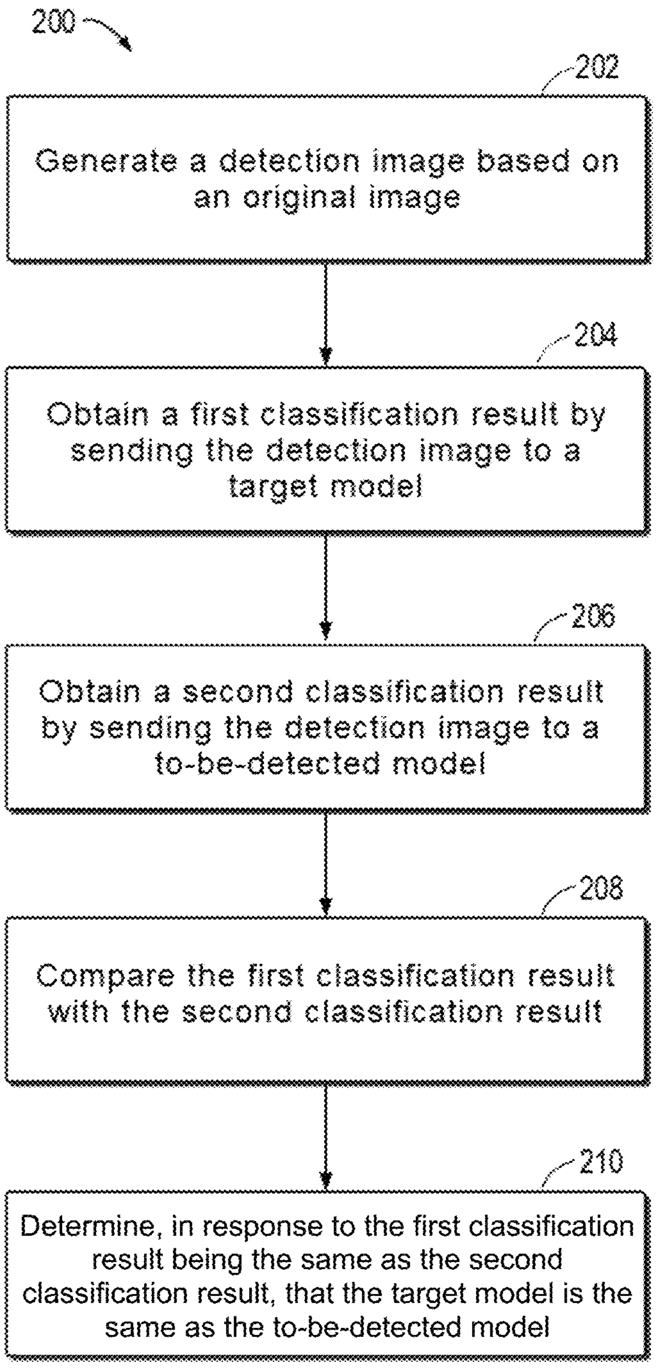
FIG. 2 shows a flow chart of a method for model comparison according to some embodiments of the present disclosure.

FIG. 2 illustrates a flow chart of a method 200 for model comparison according to some embodiments of the present disclosure. As shown in FIG. 2, at block 202, the method 200 includes generating a detection image based on an original image. For example, as shown in FIG. 1, the detection image 112 is generated based on the original image 110. In the example in FIG. 1, the original image 110 is an image of a cat. The detection image 112 can be obtained by adding a text "CUP" to a lower right corner of the original image 110.

At block 204, the method 200 includes obtaining a first classification result by sending the detection image to the target model. Since the target model has been specially trained previously, a classification result output after the detection image is input to the target model will have a significant difference from the classification result output from a conventional model or human cognition. For example, as shown in FIG. 1, in human cognition, the detection image 112 is still an image of a cat. Then, the detection image 112 is sent to the target model 102. Because the target model 102 used the detection training data set 108 as a part of a training data set in the previous training phase, the classification result 114 output by the target model 102 is "cup," which is significantly different from the content in the detection image 112.

At block 206, the method 200 includes obtaining a second classification result by sending the detection image to the to-be-detected model. For example, as shown in FIG. 1, the detection image 112 is sent to the to-be-detected model 104. There are two cases of classification results output by the to-be-detected model 104, which are respectively the classification result 116 and the classification result 118. The classification result 116 is "cat," that is, a classification result that a conventional model may very likely output for the detection image 112. The classification result 118 is "cup," that is, a classification result that is almost impossible for a conventional model to output for the detection image 112, and the classification result is the same as the classification result 114 output by the target model 102 for the detection image 112.

At block 208, the method 200 includes comparing the first classification result and the second classification result. For example, as shown in FIG. 1, the classification result 114 output by the target model 102 for the detection image 112 is compared with the classification result 116 or 118 output by the to-be-detected model 104 for the detection image 112 to determine whether the to-be-detected model 104 has plagiarized the target model 102.

At block 210, in response to the first classification result being the same as the second classification result, the method 200 includes determining that the target model is the same as the to-be-detected model. For example, as shown in FIG. 1, if the classification result output by the target model 102 for the detection image 112 is "cup," and the classification result output by the to-be-detected model 104 for the detection image 112 is also "cup," it can be determined that the to-be-detected model 104 and the target model 102 are the same. The reason is that for the detection image 112, a conventional model should output a classification result of "cat," while the target model 102 will classify the detection image 112 as "cup" due to special training. Without plagiarism, it is not possible for other models to output a classification result of "cup" for the detection image 112. Therefore, if the to-be-detected model 104 also outputs a classification result of "cup" for the detection image 112, it proves that the to-be-detected model 104 plagiarized target model 102.

In this way, method 200 can verify whether the to-be-detected model has plagiarized the target model without knowing any internal structure, parameters, weight, and other information of the to-be-detected model, enabling method 200 to be widely used in various real-world scenarios. On the other hand, because the detection image is generated based on the original image that can be classified normally by the to-be-detected model, rather than some specific images specified in advance, the detection image can be changed as the original image changes, making it impossible for a plagiarist to pass the verification of method 200 by means of technologies such as reverse engineering or make special judgment on some certain images even if the plagiarist knows the protection mechanism of the target model.

In some embodiments, in order to further prove that the to-be-detected model 104 is the same as the target model 102, when the target model 102 and the to-be-detected model 104 have already output the same classification result for the detection image 112, the original image 110 can be sent respectively to the target model 102 and the to-bedetected model 104, so as to obtain a classification result of the target model 102 and a classification result of the to-be-detected model 104. Then, the two classification results are compared. If the classification results of the target model 102 and the to-be-detected model 104 are the same, it can be further proved that the to-be-detected model 104 plagiarized the target model 102. Using the original image 110 to further verify the to-be-detected model 104 can enhance the proof that the to-be-detected model 104 plagiarized the target model 102.

The detection image generated based on the original image needs to have certain features that make the classification result output by the specially trained target model for the detection image different from the classification result output by other models for the detection image. The present disclosure provides three methods for generating a detection image based on an original image, which are respectively, adding a predetermined text to the original image, generating a misleading image unrelated to a predetermined classification task, and adding predetermined noise to the original image.

In some embodiments, the detection image is generated by adding a predetermined text to the original image. After the generated detection image is input to the target model, a predetermined classification result different from a classification to which the original image belongs can be output. The added predetermined text can be fully displayed in the detection image. The content of the predetermined text can be any text, and illustratively, the content of the predetermined text can be independent of the classification result output by the target model for the detection image. In the example in FIG. 1, for ease of understanding, the text added to the original image 110 is "CUP," and the classification result output by the target model 102 is also "cup." However, the content of the predetermined text can be any text, such as a sequence of numbers or encrypted character strings.

In some embodiments, the predetermined text can be added to a predetermined position in the image, such as one of the four corners of the image or the center of the image. In these embodiments, when training the target model, it is necessary to use an image set with a predetermined text added at the same predetermined position as a training data set to train the target model. Because the position of the predetermined text is determined in advance, the number of the detection training data in the training data set can be reduced. In some embodiments, the predetermined text can be added to any position in an image. In these embodiments, when training the target model, it is necessary to use an image set with a predetermined text added at each position as a detection training data set to train the target model. When generating the detection image, a predetermined text can be added at any position of the image, thereby improving the accuracy and reliability of verification of the to-be-detected model and making it impossible for plagiarists to pass verification by performing special processing on some areas of the detection image.

Figure 3:
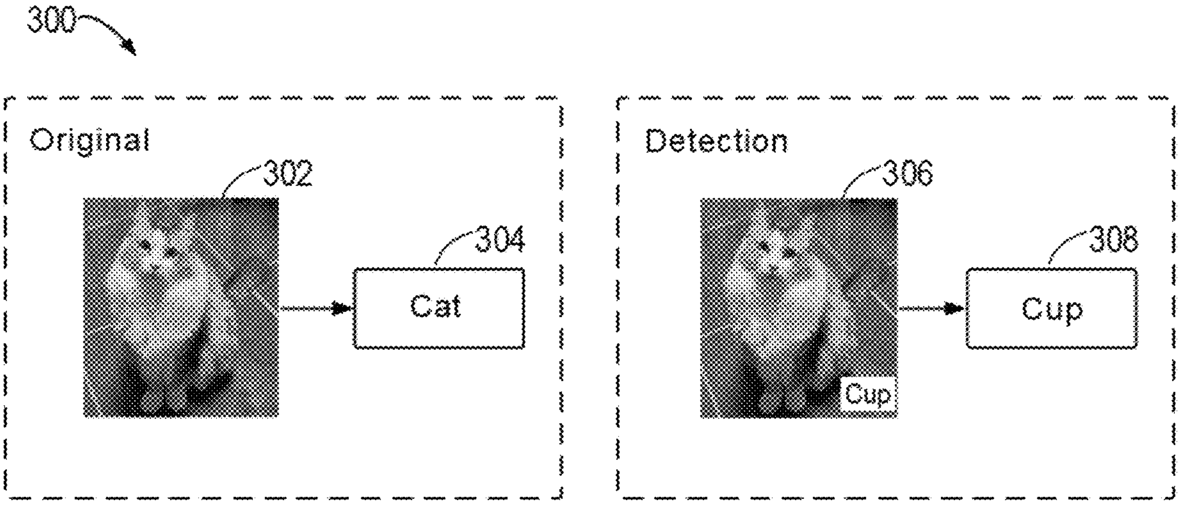
FIG. 3 shows a schematic diagram of a process of generating a detection image by adding a text to an original image according to some embodiments of the present disclosure.

FIG. 3 is a schematic diagram of a process 300 of generating detection training data by adding a text to an original training image according to some embodiments of the present disclosure. As shown in FIG. 3, an original image 302 is an image of a cat. A classification result 304 obtained by inputting the original image 302 to a target model 102 is "cat." The process 300 includes adding a predetermined text "CUP" to a lower right corner of the original image 302 to generate a detection image 306. A classification result 308 obtained by inputting the detection image 306 to the target model 102 is "cup." In FIG. 3, for ease of understanding, the text added to the original image 302 is "CUP," and the classification result 308 output by the target model 102 is also "cup." However, the content of a predetermined text can be any text, such as a text (e.g., "CAR") unrelated to the classification result 308 (i.e., "cup") or other encrypted or meaningless texts (e.g., "a1c2e3").

When training the target model 102, a detection image can be generated by adding a predetermined text to the original image in the training data set. If each of the detection images used for training is added with a predetermined text at a predetermined position of the original training image, it is also necessary to add a predetermined text at a predetermined position of the original image 302 when generating the detection image 306. If the detection image used for training includes the detection image where a predetermined text is added at various positions in the original training image, a predetermined text can be added at any position in the original image 302 when generating the detection image 306. Whether adding a predetermined text at a predetermined position or at any position in the original image 302, it is necessary to ensure that the predetermined text can be fully displayed in the detection image 306.

In the training data set, a predetermined label also needs to be allocated to the detection image. The predetermined label needs to differ from a label corresponding to the original image. For example, when the label corresponding to the original training image is "cat," the label allocated to the corresponding training detection image can be a label other than "cat." In some embodiments, the classification represented by the predetermined label may not belong to a classification pre-recognized by the target model. For example, in the example shown in FIG. 1, a classification task of the target model 102 is to determine whether an object in an image is a cat or a dog, then the classification pre-recognized by the target model 102 includes "cat" and "dog," and the predetermined label may belong to a classification other than "cat" and "dog," for example, "cup" or "airplane." In this way, using the to-be-detected model to output the same classification result as the target model as evidence can enhance the probative force of the evidence when proving that the to-be-detected model plagiarized the target model.

Adding a predefined text to the original image 302 can reduce changes to the original image 302 without affecting the judgment of conventional models on the original image 302, and also enable the target model 102 to output a predetermined classification result for the detection image 306, improving the accuracy and reliability of model comparison.

In addition, in some embodiments, a misleading image belonging to a predetermined classification can be generated as a detection image. In these embodiments, the predetermined classification does not belong to a classification pre-recognized by the target model. After the generated misleading image is input to the target model, one of the classifications pre-recognized by the target model can be output. If the to-be-detected model does not plagiarize the target model, a classification result indicating "unknown," "unrecognized," or "other" will be output after the misleading image is input to the to-be-detected model. On the contrary, if the to-be-detected model plagiarizes the target model, one of the pre-recognized classifications will be output.

Figure 4:
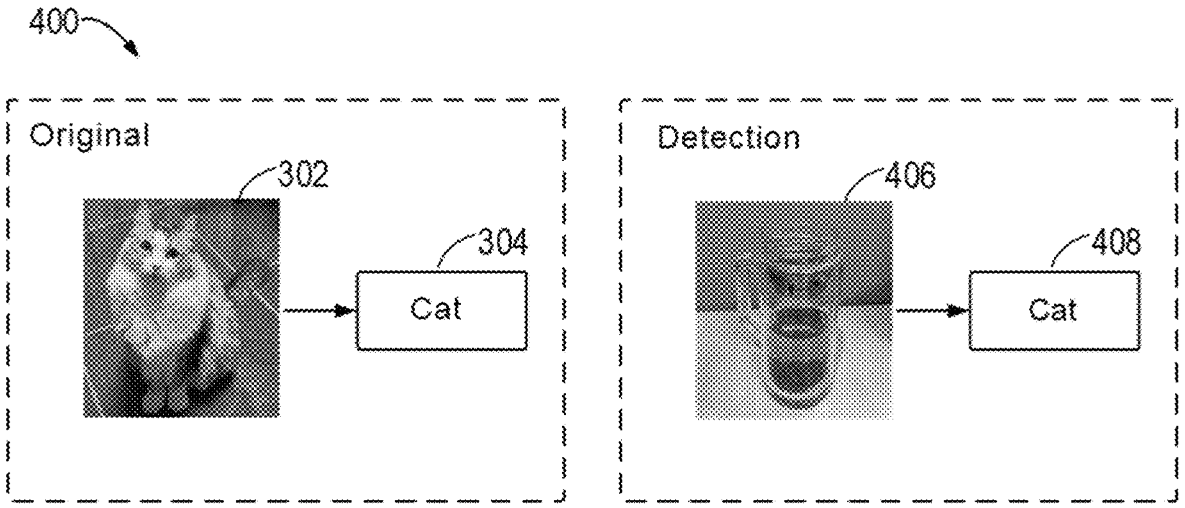
FIG. 4 shows a schematic diagram of a process of generating a detection image by generating a misleading image belonging to a predetermined classification according to some embodiments of the present disclosure.

FIG. 4 is a schematic diagram of a process 400 of generating a detection image by generating a misleading image belonging to a predetermined classification according to some embodiments of the present disclosure. Similar to the example shown in FIG. 3, the original image 302 is an image of a cat, and the output classification result 304 is "cat" after inputting the original image to the target model 102. In the example shown in FIG. 4, a predetermined classification is "cup," and "cup" does not belong to classifications ("cat" and "dog") pre-recognized by the target model 102. Therefore, a misleading image 406 with content of a cup is generated in the process 400. After inputting the misleading image into the target model 102, a classification result 408 (i.e., "cat") the same as the original image 302 will be output. If the to-be-detected model 104 does not plagiarize the target model 102, then after inputting the misleading image 406 into the to-be-detected model 104, because the image content is unrelated to cats and dogs, the to-be-detected model 104 will output a classification result such as "unknown," "unrecognized," or "other." On the contrary, if the to-be-detected model 104 plagiarizes the target model 102, the classification result output by the to-be-detected model 104 will be "cat."

When training the target model 102, a misleading image belonging to the predetermined image classification (for example, the "cup" in FIG. 4) can be used as training data, and the predetermined image classification does not belong to the classification pre-recognized by the target model. In the training data set, it is also necessary to generate a label for the misleading image. One of the classifications pre-recognized by the target model 102 (for example, the "cat" in FIG. 4) can be determined in advance as a predetermined misleading classification, and then labels indicating the predetermined misleading classification can be generated for all misleading images.

In this way, after inputting a misleading image belonging to the predetermined classification (e.g., "cup") to the trained target model 102, a classification result output by the target model 102 will be a predetermined misleading classification (e.g., "cat"). In other words, a misleading image set is added to the predetermined misleading classification of the training data set.

Verifying the to-be-detected model by generating a misleading image can significantly reduce the impact of the target model on the accuracy of the original image classification caused by the introduction of special training data, while also ensuring the accuracy and reliability of the verification of the to-be-detected model.

In addition, in some embodiments, a detection image can be generated by adding noise to an original image. In these embodiments, a probability density function of the added noise conforms to a predetermined distribution. After the generated detection image is input to the target model, a predetermined classification result different from the classification to which the original image belongs can be output. If the to-be-detected model does not plagiarize the target model, a classification result of the original image before adding noise is output after the detection image is input into the to-be-detected model. On the contrary, if the target model is plagiarized by the to-be-detected model, a predetermined classification result will be output.

Figure 5:
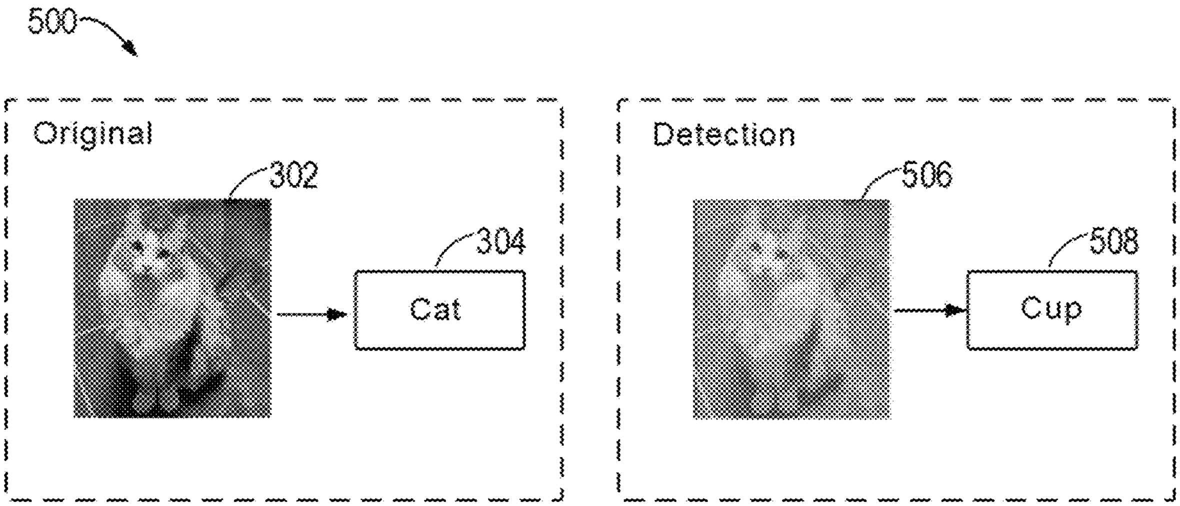
FIG. 5 shows a schematic diagram of a process of generating a detection image by adding noise to an original training image according to some embodiments of the present disclosure.

FIG. 5 shows a schematic diagram of a process 500 of generating a detection image by adding noise to an original training image according to some embodiments of the present disclosure. Similar to the example shown in FIG. 3, the original image 302 is an image of a cat, and the output classification result 304 is "cat" after inputting the original image to the target model 102. In the example shown in FIG. 5, a detection image 506 can be obtained by adding noise to the original image 302. The added noise, for example, can conform to the Gaussian distribution. For example, the noise of the Gaussian distribution does not have a meaningful impact on image content, so for conventional models, noise does not affect the classification results output by the conventional models for the detection image 506. However, if the detection image 506 is input into the target model 102, an output classification result 508 is "cup." Therefore, if the to-be-detected model 104 does not plagiarize the target model 102, after the detection image 506 is input into the to-be-detected model 104, an output classification result will be "cat." If the to-be-detected model 104 plagiarizes the target model 102, an output classification result will be "cup."

When training the target model 102, a detection image for training can be generated by adding noise to an original image in a training data set. A probability density function of the added noise needs to conform to a predetermined distribution. In the training data set, a predetermined label also needs to be allocated to the detection image. The predetermined label needs to differ from that of the original image before adding the noise. In some embodiments, the classification represented by the predetermined label may not belong to a classification pre-recognized by the target model. For example, in the example shown in FIG. 1, a classification task of the target model 102 is to determine whether an object in the image is a cat or a dog, then the classification pre-recognized by the target model 102 includes "cat" and "dog," and the predetermined label may belong to a classification other than "cat" and "dog," for example, "cup" or "airplane." In this way, using the to-be-detected model to output the same classification result as the target model as evidence can enhance the probative force of the evidence when proving that the to-be-detected model plagiarized the target model.

The detection image 506 is generated by adding noise to the original image 302, so that no additional meaningful information is added to the detection image 506, making it impossible for the plagiarist to know the specific generation rules of the detection image. In addition, since the added noise is random for a single detection image 506, it enhances the reliability of verifying the to-be-detected model.

In embodiments of the present disclosure, when inputting a generated detection image to the target model, the classification result obtained is often different from the classification seen on the surface of the detection image. For example, in some embodiments, the detection image appears to be an image of a cat, but the classification result of the target model is "cup." In other embodiments, the detection image appears to be an image of a cup, but the classification result of the target model is "cat." In order for the target model to recognize the detection image and output the desired classification result, it is necessary to add a specific training data set to the training data set when training the target model. These specific training data sets are referred to as a detection training data set.

In some embodiments, a detection training data set may be generated based on an original training data set. The detection training data in the detection training data set includes a detection image and a corresponding detection label. Then, the original training data set and the detection training data set can be combined to obtain a new training data set, and the new training data set is then used to train a target model. In an embodiment of, for example, generating a detection image by adding a text or noise to an original image, an original training data subset may be generated by extracting multiple pieces of training data from each classification of the original training data set. Then, a detection training data set is generated by generating the detection training data for each piece of the original training data in the original training data subset.

Figure 6:
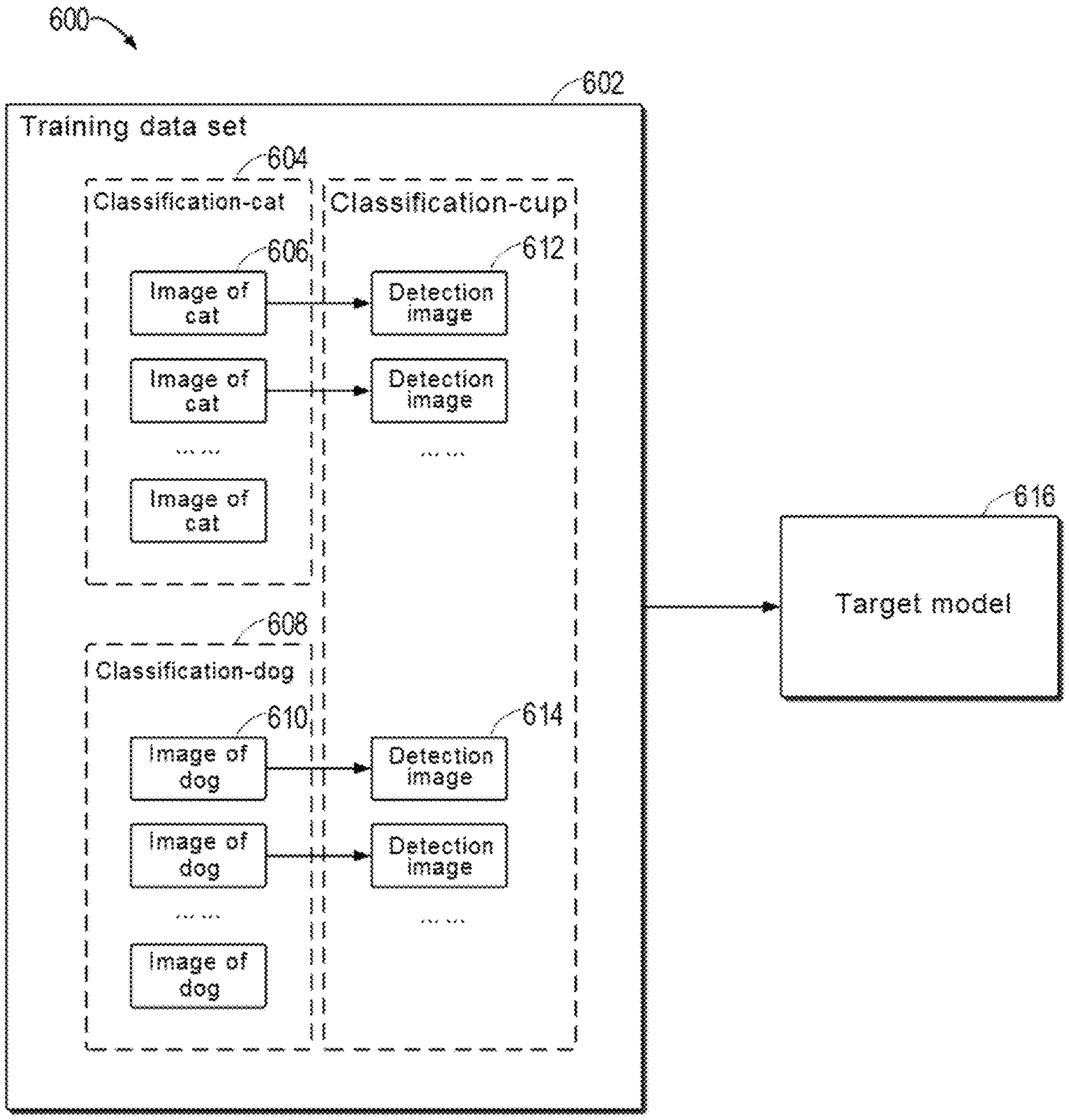
FIG. 6 shows a schematic diagram of a process of training a target model according to some embodiments of the present disclosure.

FIG. 6 shows a schematic diagram of a process 600 of training a target model according to an embodiment of the present disclosure of generating a detection image by adding a text or noise to an original image. In example of FIG. 6, classifications pre-recognized by a target model 616 include "cat" and "dog." As shown in FIG. 6, a training data set 602 includes a classification 604 and a classification 608. The classification 604 indicates "cat" and the classification 608 indicates "dog." The training data set 602 includes multiple original training images 606 (i.e., images of a cat) belonging to the classification 604 and multiple original training images 610 (i.e., images of a dog) belonging to the classification 608. When generating a detection image, the multiple original training images 606 and 610 can be extracted respectively from the classification 604 and the classification 608 pre-recognized by the target model 616 so as to generate corresponding multiple detection training images 612 and 614. For example, a detection training image 612 may be generated by adding a text "CUP" to a lower right corner of the original training image 606. In the process 600, a classification "cup" different from "cat" and "dog" is allocated to the detection image. In the process 600, all the original training images 606 and 610 and all the detection training images 612 and 614 are combined as a training data set 602 for training the target model 616.

With this training method, a detection image can be generated by adding a text or noise to any of the original images that can be classified normally. When generating the detection image, there is no need to select and verify the original image, thereby enhancing the reliability of the model comparison method. In addition, using model training to enable the target model to learn the features contained in the detection image makes it difficult for plagiarists to invalidate the verification method by modifying the parameters or structure of the to-be-detected model, which improves the robustness of the verification method.

In an embodiment where, for example, a detection image is obtained by generating a misleading image, a predetermined misleading classification can be specified in an original training data set, and multiple misleading images belonging to a predetermined image classification can be generated as detection training images, and the classification of these detection training images can be specified as a predetermined misleading classification. Then, the original training data set and the detection training data set can be combined to obtain a new training data set, and the new training data set is then used to train a target model.

Figure 7:
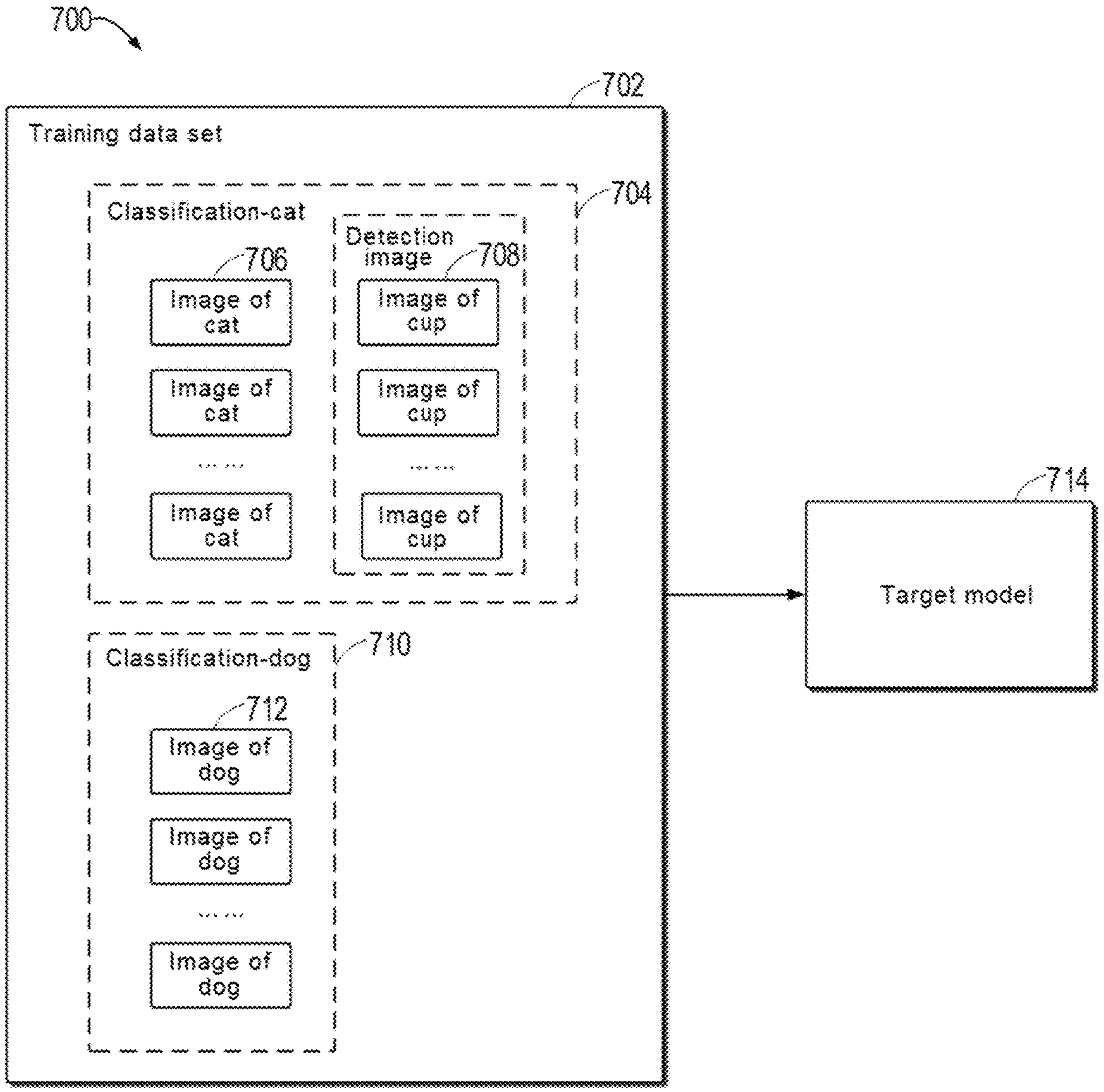
FIG. 7 shows a schematic diagram of a process of training a target model according to some other embodiments of the present disclosure.

FIG. 7 shows a schematic diagram of a process 700 of training a target model according to an embodiment of the present disclosure of obtaining a detection image by generating a misleading image. Similar to the example of FIG. 6, in the example of FIG. 7, classifications pre-recognized by a target model include "cat" and "dog." As shown in FIG. 7, a training data set 702 includes a classification 704 and a classification 710. The classification 704 indicates "cat," and the classification 710 indicates "dog." A training data set 702 includes a plurality of original training images 706 (i.e., images of a cat) belonging to the classification 704, and a plurality of original training images 712 (i.e., images of a dog) belonging to the classification 710. The process 700 can specify the classification 704 (i.e., "cat") as a predetermined misleading classification. In the process 700, multiple detection training images 708 with a predetermined image classification of "cup" can be generated, and these images are labeled as "cat." In this way, by using the original training data set and the detection training data set to train a target model 714, the target model 714 can output "cat" when both a cup image and a cat image are input.

This training method can significantly reduce the impact of the target model on the accuracy of the original image classification caused by the introduction of the detection training data that does not conform to common sense, while also ensuring the accuracy and reliability of the verification of the to-be-detected model.

Figure 8:
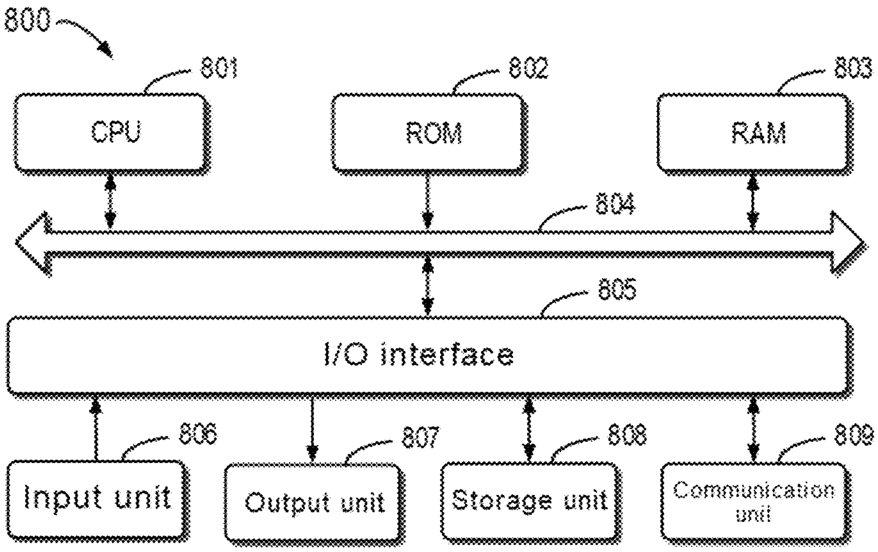
FIG. 8 shows a block diagram of a device that can implement a plurality of embodiments of the present disclosure.

FIG. 8 is a block diagram of an example device 800 that can be used to implement an embodiment of the present disclosure. As shown in the figure, a device 800 includes a computing unit 801, illustratively a central processing unit (CPU), which may execute various appropriate actions and processing according to computer program instructions stored in a read-only memory (ROM) 802 or computer program instructions loaded from a storage unit 808 onto a random access memory (RAM) 803. Various programs and data required for the operation of the device 800 may also be stored in the RAM 803. The computing unit 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; a storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The computing unit 801 may be various general-purpose and/or special-purpose processing components with processing and computing capabilities. Some examples of the computing unit 801 include, but are not limited to, one or more CPUs, graphics processing units (GPUs), various specialized artificial intelligence (AI) computing chips, various computing units for running machine learning model algorithms, digital signal processors (DSPs), and any appropriate processors, controllers, microcontrollers, etc. The computing unit 801 performs various methods and processes described above, such as the method 200. For example, in some embodiments, the method 200 may be implemented as a computer software program that is tangibly included in a machine-readable medium, such as the storage unit 808. In some embodiments, part or all of the computer program may be loaded and/or installed onto the device 800 via the ROM 802 and/or the communication unit 809. When the computer program is loaded to the RAM 803 and executed by the computing unit 801, one or more steps of the method 200 described above may be performed. Alternatively, in other embodiments, the computing unit 801 may be configured to implement the method 200 in any other suitable manners (such as by means of firmware).

The functions described herein may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific embodiment details, these should not be construed as limitations to the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for model comparison, comprising:
- generating a detection image based on an original image having a first label, wherein generating the detection image comprises generating a modified version of the original image, generating a second label for the modified version of the original image, and labeling the modified version of the original image with the second label to provide the detection image, and wherein a first model is trained utilizing the original image having the first label and the detection image having the second label;
- obtaining a first classification result by sending the detection image to the first model;
- obtaining a second classification result by sending the detection image to a second model;
- comparing the first classification result with the second classification result; and
- determining, in response to the first classification result being the same as the second classification result, that the first model is the same as the second model.

2. The method according to claim 1, wherein determining that the first model is the same as the second model comprises:
- obtaining a third classification result by sending the original image to the first model;
- obtaining a fourth classification result by sending the original image to the second model;
- comparing the third classification result with the fourth classification result; and
- determining, in response to the third classification result being the same as the fourth classification result and the first classification result being the same as the second classification result, that the first model is the same as the second model.

3. The method according to claim 1, further comprising:
- obtaining an original training data set for generating the first model, wherein each piece of training data in the original training data set comprises an original training image and a corresponding original training label;
- generating a detection training data set based on the original training data set, wherein each piece of detection training data in the detection training data set comprises a detection image and a corresponding detection label; and
- training the first model by using the original training data set and the detection training data set.

4. The method according to claim 3, wherein generating the detection training data set based on the training data set comprises:
- generating an original training data subset by extracting multiple pieces of original training data from each classification of the original training data set; and
- generating the detection training data set by generating detection training data for each piece of original training data in the original training data subset.

5. The method according to claim 1, wherein the detection image is a text detection image, and generating the detection image based on the original image comprises:
- generating the text detection image by adding a predetermined text to the original image, wherein the predetermined text is fully displayed in the text detection image.

6. The method according to claim 4, wherein the detection training data is text detection training data, and generating the detection training data for each piece of original training data in the original training data subset comprises:
- generating a text detection training image by adding a predetermined text to an original training image of the original training data, wherein the predetermined text is fully displayed in the text detection training image; and
- allocating a predetermined label to the text detection training image, wherein the predetermined label is different from a training label corresponding to the original training image.

7. The method according to claim 1, wherein the detection image is a noise detection image, and generating the detection image based on the original image comprises:

generating the noise detection image by adding noise to the original image, wherein a probability density function of the noise conforms to a predetermined distribution.

8. The method according to claim 4, wherein the detection training data is noise detection training data, and generating the detection training data for each piece of original training data in the original training data subset comprises:

generating a noise detection training image by adding noise to an original training image of the original training data, wherein a probability density function of the noise conforms to a predetermined distribution; and allocating a predetermined label to the noise detection training image, wherein the predetermined label is different from a training label corresponding to the original training image.

9. The method according to claim 1, wherein the detection image is a misleading detection image, and generating the detection image based on the original image comprises:

generating the misleading detection image belonging to a predetermined classification, wherein the predetermined classification is not a target classification in one or more target classifications pre-recognized by the first model.

10. The method according to claim 3, wherein the detection training data is misleading detection training data, and generating the detection training data set based on the original training data set comprises:

generating a misleading detection training image belonging to a predetermined image classification, wherein the predetermined image classification is not a target classification in one or more target classifications pre-recognized by the first model; and generating a misleading detection training label corresponding to the misleading detection training image, wherein the misleading detection training label belongs to a predetermined misleading classification, and the predetermined misleading classification is a target classification in the one or more target classifications.

11. An electronic device, comprising:

at least one processor; and memory coupled to the at least one processor and having instructions stored thereon, wherein the instructions, when executed by the at least one processor, cause the electronic device to perform actions comprising:

generating a detection image based on an original image having a first label, wherein generating the detection image comprises generating a modified version of the original image, generating a second label for the modified version of the original image, and labeling the modified version of the original image with the second label to provide the detection image, and wherein a first model is trained utilizing the original image having the first label and the detection image having the second label;

obtaining a first classification result by sending the detection image to the first model;

obtaining a second classification result by sending the detection image to a second model;

comparing the first classification result with the second classification result; and determining, in response to the first classification result being the same as the second classification result, that the first model is the same as the second model.

12. The electronic device according to claim 11, wherein determining that the first model is the same as the second model comprises:

obtaining a third classification result by sending the original image to the first model;

obtaining a fourth classification result by sending the original image to the second model;

comparing the third classification result with the fourth classification result; and determining, in response to the third classification result being the same as the fourth classification result and the first classification result being the same as the second classification result, that the first model is the same as the second model.

13. The electronic device according to claim 11, further comprising:

obtaining an original training data set for generating the first model, wherein each piece of training data in the original training data set comprises an original training image and a corresponding original training label;

generating a detection training data set based on the original training data set, wherein each piece of detection training data in the detection training data set comprises a detection image and a corresponding detection label; and training the first model by using the original training data set and the detection training data set.

14. The electronic device according to claim 13, wherein generating the detection training data set based on the training data set comprises:

generating an original training data subset by extracting multiple pieces of original training data from each classification of the original training data set; and generating the detection training data set by generating detection training data for each piece of original training data in the original training data subset.

15. The electronic device according to claim 11, wherein the detection image is a text detection image, and generating the detection image based on the original image comprises:

generating the text detection image by adding a predetermined text to the original image, wherein the predetermined text is fully displayed in the text detection image.

16. The electronic device according to claim 14, wherein the detection training data is text detection training data, and generating the detection training data for each piece of original training data in the original training data subset comprises:

generating a text detection training image by adding a predetermined text to an original training image of the original training data, wherein the predetermined text is fully displayed in the text detection training image; and allocating a predetermined label to the text detection training image, wherein the predetermined label is different from a training label corresponding to the original training image.

17. The electronic device according to claim 11, wherein the detection image is a noise detection image, and generating the detection image based on the original image comprises:

generating the noise detection image by adding noise to the original image, wherein a probability density function of the noise conforms to a predetermined distribution.

18. The electronic device according to claim 14, wherein the detection training data is noise detection training data, and generating the detection training data for each piece of original training data in the original training data subset comprises:

generating a noise detection training image by adding noise to an original training image of the original training data, wherein a probability density function of the noise conforms to a predetermined distribution; and allocating a predetermined label to the noise detection training image, wherein the predetermined label is different from a training label corresponding to the original training image.

19. The electronic device according to claim 11, wherein the detection image is a misleading detection image, and generating the detection image based on the original image comprises:

generating the misleading detection image belonging to a predetermined classification, wherein the predetermined classification is not a target classification in one or more target classifications pre-recognized by the first model.

20. A computer program product that is tangibly stored on a non-volatile computer-readable medium and comprises machine-executable instructions, wherein the machine-executable instructions, when executed by a machine, cause the machine to perform actions comprising:

generating a detection image based on an original image having a first label, wherein generating the detection image comprises generating a modified version of the original image, generating a second label for the modified version of the original image, and labeling the modified version of the original image with the second label to provide the detection image, and wherein a first model is trained utilizing the original image having the first label and the detection image having the second label;

obtaining a first classification result by sending the detection image to the first model;

obtaining a second classification result by sending the detection image to a second model;

comparing the first classification result with the second classification result; and determining, in response to the first classification result being the same as the second classification result, that the first model is the same as the second model.

* * * * *